United States Patent
Kawai et al.

(10) Patent No.: US 10,248,107 B2
(45) Date of Patent: Apr. 2, 2019

(54) CONTROL DEVICE FOR MACHINE TOOL, AND MACHINE TOOL

(71) Applicant: MAKINO MILLING MACHINE CO., LTD., Tokyo (JP)

(72) Inventors: Rie Kawai, Aiko-gun (JP); Hideki Heishi, Aiko-gun (JP); Kenichi Ono, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 0 days.

(21) Appl. No.: 15/510,120

(22) PCT Filed: Sep. 30, 2014

(86) PCT No.: PCT/JP2014/076221
§ 371 (c)(1),
(2) Date: Mar. 9, 2017

(87) PCT Pub. No.: WO2016/051543
PCT Pub. Date: Apr. 7, 2016

(65) Prior Publication Data
US 2017/0308063 A1    Oct. 26, 2017

(51) Int. Cl.
*G05B 19/00* (2006.01)
*B23Q 15/00* (2006.01)
(Continued)

(52) U.S. Cl.
CPC ....... *G05B 19/40938* (2013.01); *B23Q 15/00* (2013.01); *B23Q 15/28* (2013.01);
(Continued)

(58) Field of Classification Search
CPC ............ G05B 19/40938; G05B 19/406; G05B 19/404; G05B 2219/50323;
(Continued)

(56) References Cited

U.S. PATENT DOCUMENTS 4,979,121 A * 12/1990 Inoue ........................ B23B 3/06
                                                            700/194
6,400,998 B1 * 6/2002 Yamazaki ............ G05B 19/401
                                                            318/568.1
(Continued)

FOREIGN PATENT DOCUMENTS

CN          103737423         4/2014
CN          103869775         6/2014
(Continued)

OTHER PUBLICATIONS

International search report dated Nov. 18, 2014, directed to PCT Application No. PCT/JP2014/076221; 2 pages.
(Continued)

*Primary Examiner* — Ronald D Hartman, Jr.
(74) *Attorney, Agent, or Firm* — Morrison & Foerster LLP

(57) ABSTRACT

Provided is a control device for a machine tool that exchanges a tool and machines a work piece on the basis of a machining program, said control device being provided with a machining program analysis unit that analyzes a machining program and extracts, from the machining program, measurement-related information relating to a dimensional measurement of a tool, and with a measurement program generation unit that, on the basis of the measurement-related information and basic tool information input in advance, generates a measurement program for measuring the dimensions of the tool.

7 Claims, 9 Drawing Sheets

(51) Int. Cl.
*B23Q 17/00* (2006.01)
*G05B 19/4093* (2006.01)
*G05B 19/404* (2006.01)
*B23Q 15/28* (2006.01)
*B23Q 17/09* (2006.01)
*G05B 19/406* (2006.01)

(52) U.S. Cl.
CPC ......... *B23Q 17/00* (2013.01); *B23Q 17/0914* (2013.01); *G05B 19/404* (2013.01); *G05B 19/406* (2013.01); *G05B 2219/37071* (2013.01); *G05B 2219/37227* (2013.01); *G05B 2219/50245* (2013.01); *G05B 2219/50291* (2013.01); *G05B 2219/50313* (2013.01); *G05B 2219/50315* (2013.01); *G05B 2219/50323* (2013.01)

(58) Field of Classification Search
CPC .......... G05B 2219/50245; G05B 2219/50291; G05B 2219/50313; G05B 2219/50315; G05B 2219/37071; B23Q 15/28; B23Q 17/0914; B23Q 15/00; B23Q 17/00
See application file for complete search history.

(56) References Cited

U.S. PATENT DOCUMENTS

| | | | | |
|---|---|---|---|---|
| 6,502,007 | B1* | 12/2002 | Kanamoto | G05B 19/40937 700/173 |
| 6,584,415 | B1* | 6/2003 | Uneme | G05B 19/4065 702/33 |
| 6,885,984 | B1* | 4/2005 | Suzuki | G05B 19/4068 700/182 |
| 9,751,181 | B2* | 9/2017 | Yamamoto | B23Q 17/2233 |
| 2002/0188622 | A1* | 12/2002 | Wallen | G05B 19/4097 |
| 2007/0250204 | A1* | 10/2007 | Ould | G05B 19/401 700/181 |
| 2008/0294877 | A1* | 11/2008 | Haga | G05B 19/4155 712/216 |
| 2011/0228050 | A1* | 9/2011 | Wang | G05B 19/4015 348/46 |
| 2012/0222001 | A1* | 8/2012 | Nakai | G05B 19/0426 717/110 |
| 2012/0296462 | A1* | 11/2012 | Otsuki | G05B 19/4069 700/104 |
| 2013/0222580 | A1* | 8/2013 | Kurahashi | B23Q 17/2409 348/135 |
| 2014/0304815 | A1* | 10/2014 | Maeda | G06F 11/3604 726/22 |
| 2015/0227130 | A1* | 8/2015 | Terada | B23B 3/162 700/186 |
| 2015/0378347 | A1* | 12/2015 | Sato | G05B 19/4063 700/193 |
| 2016/0109872 | A1* | 4/2016 | Sagasaki | G05B 19/182 700/169 |
| 2016/0320772 | A1* | 11/2016 | Ono | G05B 19/40938 |
| 2016/0327938 | A1* | 11/2016 | Kawai | G05B 19/40937 |
| 2016/0368068 | A1* | 12/2016 | Shamoto | B23C 5/28 |

FOREIGN PATENT DOCUMENTS

| | | |
|---|---|---|
| CN | 103909426 | 7/2014 |
| JP | 4-348842 | 12/1992 |
| JP | 6-179153 | 6/1994 |
| JP | 7-24543 | 5/1995 |
| JP | 8-229776 | 9/1996 |
| JP | 10-118890 | 5/1998 |
| JP | 11-138392 | 5/1999 |
| JP | 3687980 | 8/2005 |
| JP | 5235284 | 10/2006 |
| JP | 2008-305237 | 12/2008 |
| JP | 5302165 | 5/2011 |
| JP | 2014-87883 | 5/2014 |

OTHER PUBLICATIONS

Missler Software: Effizienter programmieren mit realen Werkzeugdaten, located at http://www.topsolid.de/anwenderberichte/detail/translate-to-german-effizienter-programmieren-mit-realen-werkzeugdaten.htm. visited on Apr. 23, 2018. 7 pages.

Extended European Search Report dated May 9, 2018; directed to EP Application No. 14903344.1; 7 pages.

XEN Soft: Werkzeugdatenblatt, located at http://www.x-msk.de/index.php/werkzeugdatenbatt visaed Apr. 23, 2018. 3 pages.

* cited by examiner

FIG. 9

CONTROL DEVICE FOR MACHINE TOOL, AND MACHINE TOOL

CROSS-REFERENCE TO RELATED APPLICATIONS

This application is a U.S. National Stage patent application of International Patent Application No. PCT/JP2014/076221, filed Sep. 30, 2014, which is hereby incorporated by reference in the present disclosure in its entirety.

FIELD OF THE INVENTION

The present invention relates to a control apparatus for a machine tool, and the machine tool.

BACKGROUND OF THE INVENTION

In a conventional technique, there are known machine tools that relatively move tools to workpieces so as to perform machining such as cutting. In addition, among such machine tools, there is known a machine tool of a numerical control type that designates a path of the tool based on coordinates or the like of a predetermined feed axis and performs machining while moving the tool relative to the workpiece. By moving at least one of the workpiece and the tool according to a command from a control apparatus, the machine tool can automatically perform machining while changing a relative positon of the tool with respect to the workpiece.

When creating a tool path that determines a relative positon of the tool with respect to the workpiece, a shape of the tool is taken into consideration. For example, a path through which the tool moves is set with a tool center used as a reference. The tool center is set on a center axis of the tool, but it is a surface of the tool that actually performs machining. Accordingly, the tool path is created with consideration given to a tool diameter. However, there is an individual difference in shape among tools, and an error occurs with regard to a basic size of the tool. Accordingly, certain machine tools may include tool measurement apparatuses that measure tool sizes such as a tool length and a tool diameter.

Japanese Unexamined Patent Application Publication No. 8-229776 discloses a machine tool that includes a measurement apparatus which measures a tool length by a displacement measuring device of electrostatic capacitance type. In this machine tool, a tool in the midst of rotation at a rotational speed for actual machining is caused to approach a measurement electrode of the displacement measurement device. Position data of a feed axis when a gap between the tool and the measurement electrode reaches a predetermined reference value is detected by a position detection unit. Then, it is disclosed that an arithmetic unit fetches tool data stored in advance in a tool data storage unit, and calculates cutting edge position displacement of the tool based on the position data and the tool data.

CITATION LIST

Patent Literature 1: Japanese Unexamined Patent Application Publication No. 8-229776

SUMMARY OF THE INVENTION

In the machine tool, a machining program that includes the tool path created based on the basic size of the tool can be used. In addition, the machine tool can perform measurement of the tool size by the tool measurement apparatus, and correct the tool path based on the actually measured tool size. The correction of the tool path based on the actually measured tool size enables a reduction of errors in size after the machining of the workpiece. Accordingly, it is preferable that the tool size is actually measured so as to correct the tool path before machining of the workpiece is performed.

In the tool measurement apparatus of the machine tool according to the conventional technique, an operator selects tools to be used for the machining program in advance. Then, the operator performs measurement of every tool size by the tool measurement apparatus. When performing measurement of the tool size, the operator used to create, in addition to manual driving of the tool measurement apparatus so as to perform measurement of the tool size, a measurement program for performing automatic measurement of each tool, and used to perform measurement of the tool size based on the measurement program.

However, when the operator manually performs measurement of the tool size, an error may occur in selecting the tool to be used, or the tool measurement apparatus may be erroneously operated. In addition, there is also a problem of taking time. When creating the measurement program in advance for performing measurement of the tool size, there are problems such as an error included in the measurement program and taking time for creating the measurement programs for all the tools.

The present invention has an object to provide a control apparatus for a machine tool that can automatically perform measurement of a tool size by a measurement method which corresponds to a tool, and a machine tool.

A control apparatus for a machine tool according to the present invention is a control apparatus for a machine tool that replaces a tool and performs machining on a workpiece based on a machining program. The control apparatus includes a machining program analysis part that analyzes the machining program and extracts measurement related information on the tool size measurement from the machining program, a storage part that stores the measurement related information, and a measurement program creation part that creates a measurement program for performing measurement of a tool size based on the measurement related information and basic information on the tool inputted in advance.

In the above invention, the measurement related information can include at least one of a tool number, presence of a correction of a tool length, presence of a correction of a tool diameter, and a rotational speed of a main spindle during machining.

In the above invention, the basic information on the tool can include at least one of a tool type, a reference tool length, a reference tool diameter, number of blades, and a curvature radius of an end part of the tool.

In the above invention, the storage part stores rules that creates the measurement program, and the measurement program creation part can select one rule corresponding to the measurement related information and the basic information on the tool, and create the measurement program based on the selected rule.

In the above invention, the measurement program creation part can calculate a measurement position in the tool based on the basic information on the tool, and create the measurement program based on the measurement position.

In the above invention, the control apparatus further includes a display part that displays information on machining, and a display control part that controls display of the display part. The machining program analysis part can determine whether or not correction of a tool diameter is included in the machining program. The display control part can display an image where measurement of the tool diameter is selected in the display part when the correction of the tool diameter is included.

In the above invention, the control apparatus further includes a tool determination part that determines whether or not the tool of which size is measured is a predetermined tool. The tool determination part can determine that the measured tool is different from the predetermined tool when the measured size of the tool exceeds a predetermined allowable range.

A machine tool according to the present invention includes the abovementioned control apparatus for the machine tool and a tool measurement apparatus that measures a tool size.

According to the present invention, the control apparatus for the machine tool that can automatically perform measurement of the tool size by the measurement method which corresponds to the tool, and the machine tool, can be provided.

BRIEF DESCRIPTION OF THE DRAWINGS

FIG. 9 is a second screen on the tool information screen according to the embodiment.

DETAILED DESCRIPTION OF THE INVENTION

Referring to FIGS. 1 to 9, a control apparatus for a machine tool, and the machine tool according to an embodiment will be described. The machine tool according to the present embodiment is a numeral control type that automatically moves a tool and a workpiece relatively to each other so as to perform machining based on a machining program.

Figure 1:
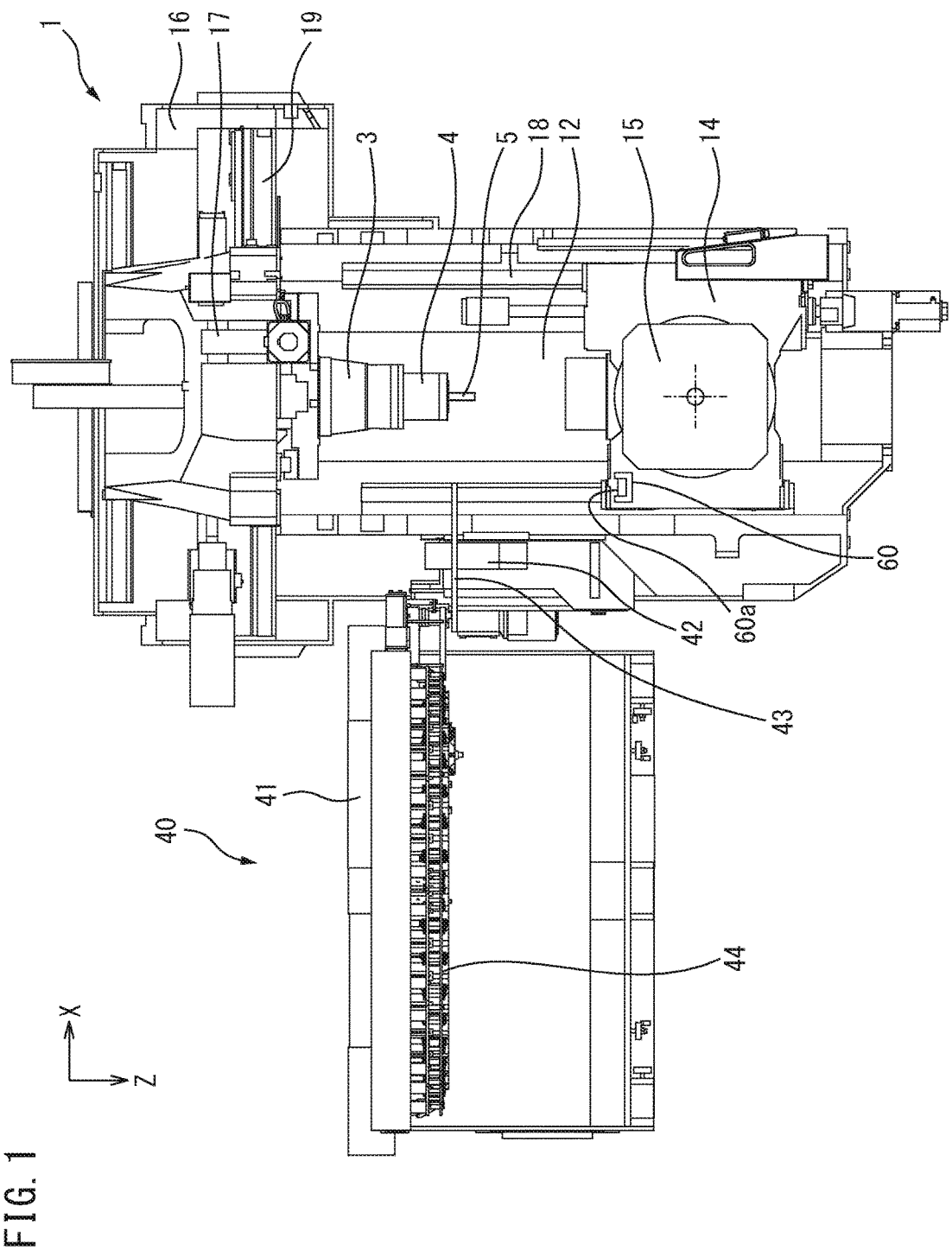
FIG. 1 is a top view of a machine tool.

FIG. 1 is a schematic plan view of the machine tool of the numerical control type according to the present embodiment. The machine tool 1 is a horizontal machining center. The machine tool 1 includes a movement apparatus that moves the tool and the workpiece relatively to each other. The movement apparatus moves a driven article in the direction of a plurality of movement axes. The plurality of movement axes include an X axis, a Y axis and a Z axis orthogonal to one another as linear feed axes.

The machine tool 1 includes a bed 12 that serves as a base, and a column 16 erected on an upper surface of the bed 12. A Z-axis guide rail 18 is fixed to the upper surface of bed 12. A table 14 is placed on an upper surface of the Z-axis guide rail 18 via a table base. The workpiece is fixed to the table 14 via a palette 15. The table 14 is formed so as to be movable along the Z-axis guide rail 18 in the direction of the Z axis.

A saddle 17 is placed in a front surface of the column 16. An X-axis guide rail 19 is fixed to the column 16. The saddle 17 is formed to be movable along the X-axis guide rail 19.

A main spindle head 3 is placed in the front surface of the saddle 17. A Y-axis guide rail is fixed to the saddle 17. The main spindle head 3 is formed so as to be movable along the Y-axis guide rail. The main spindle head 3 supports a main spindle 4. A tool 5 for performing machining on the workpiece is fixed to the main spindle 4. In the main spindle 4, a motor for rotating the tool 5 is incorporated. By driving the motor, the tool 5 rotates around an axis of the main spindle 4 that functions as a rotation axis.

In the machine tool 1 according to the present embodiment, the tool 5 moves in the direction of the X axis and the direction of the Y axis, while the workpiece moves in the direction of the Z axis. Note that the movement apparatus is not limited to this form, but the tool can be relatively moved to the workpiece by an optional apparatus. In addition, the machine tool may have a rotation feed axis that rotates around a predetermined axis in addition to the linear feed axes.

The machine tool 1 according to the present embodiment includes a tool measurement apparatus 60 that measures the tool size. The tool measurement apparatus 60 is placed at an end part of the table 14. The tool measurement apparatus 60 according to the present embodiment oscillates a laser light 60a. When the tool 5 is caused to approach the laser light 60a, the laser light 60a is blocked by the tool 5. The size of the tool 5 can be measured based on machine coordinates of the blocked laser light 60a. The tool measurement apparatus is not limited to this form, but an optional apparatus that can measure the tool size can be employed. For example, an apparatus that measures the tool size by causing a probe to come into contact with the tool, an apparatus that measures the tool size by photographing a shape of the tool and analyzing an image, and the like are exemplified.

The machine tool 1 includes a tool replacement apparatus 40 that automatically replaces the tool. The tool replacement apparatus 40 includes a tool magazine 41 that stores a plurality of tools 5, and an operation apparatus 42 that operates the tool between the tool magazine 41 and the main spindle 4. The operation apparatus 42 is placed in a boundary part between the bed 12 and the tool magazine 41. The operation apparatus 42 has a replacement arm 43 that is rotatable around a rotation axis as a center extending in the direction of the Z axis.

The tool magazine 41 according to the present embodiment includes a chain assembly 44 that moves along the guide rails. The chain assembly 44 is formed so as to hold a tool pot into which the tool 5 is inserted.

When replacing the tool 5, through movement of the chain assembly, a predetermined tool is moved to a positon where the tool can be held by the replacement arm 43. In addition, through movement of the man spindle head 3, the tool 5 held by the main spindle 4 is placed at a position where the tool can be held by the replacement arm 43. Then, the operation apparatus 42 can fit the tool stored in the tool magazine 41 to the main spindle 4. Alternatively, the operation apparatus 42 can move the tool fitted to the main spindle 4 to the tool magazine 41. Note that the tool replacement apparatus is not limited to this form, but any apparatus may be employed as long as it can replace the tool to be fitted to the main spindle.

Figure 2:
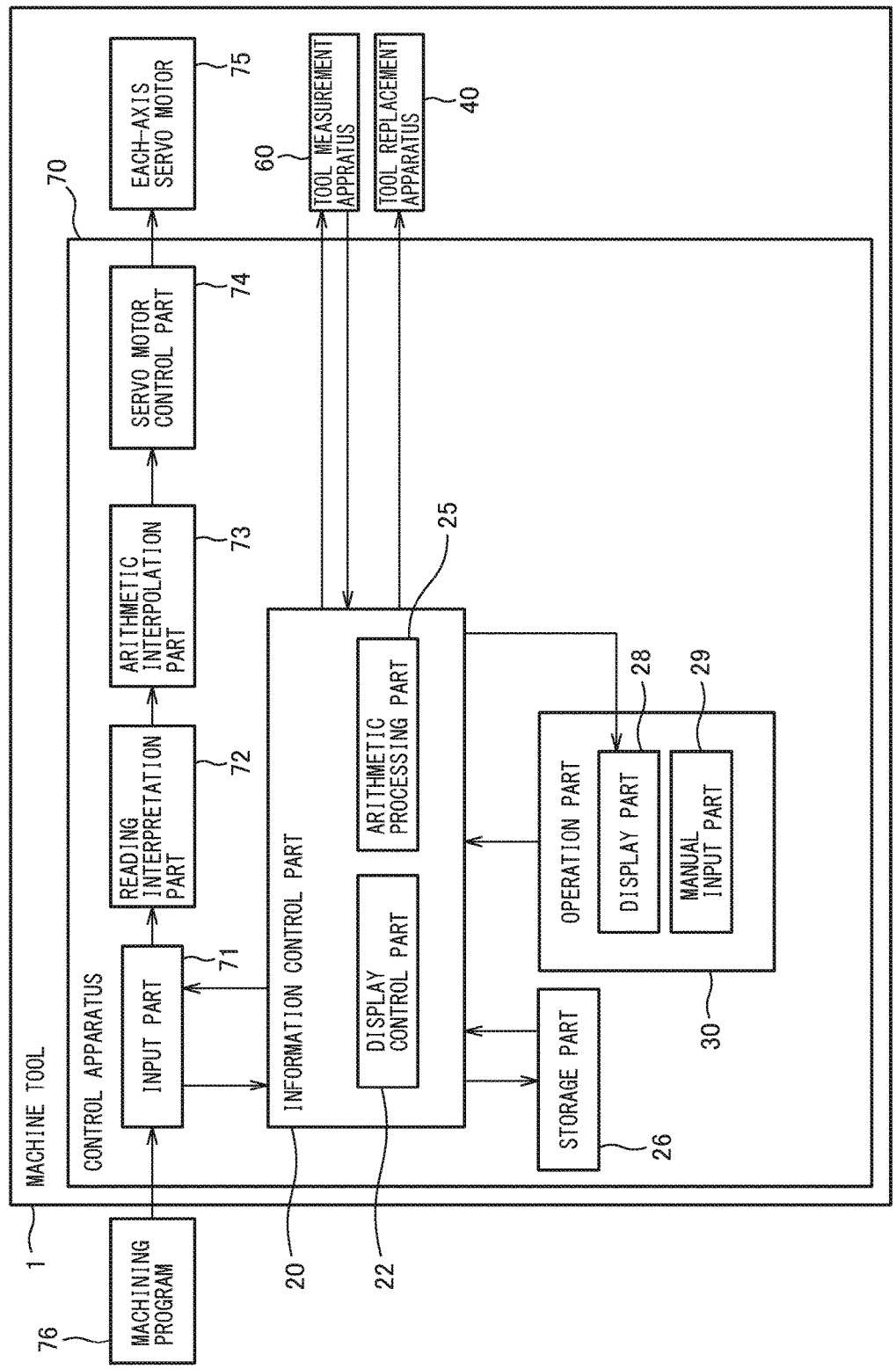
FIG. 2 is a block diagram of the machine tool.

FIG. 2 illustrates a block diagram of the machine tool according to the present embodiment. The machine tool 1 includes a control apparatus 70 that controls the movement apparatus for each feed axis. The control apparatus 70 includes, for example, a CPU (Central Processing Unit), a RAM (Random Access Memory), a ROM (Read Only Memory) and the like that are interconnected via a bus.

The control apparatus 70 includes an input part 71, a reading-interpretation part 72, an arithmetic interpolation part 73, and a servo motor control part 74. When performing machining by the machine tool of the numerical control type, a machining program 76 is prepared in advance. The machining program 76 can be created by a CAM (Computer Aided Manufacturing) apparatus or the like based on a target shape of the workpiece. The target shape of the workpiece can be created, for example, by a CAD (Computer Aided Design) apparatus.

The machining program 76 is inputted to the input part 71. The machining program 76 includes information on relative movement of the tool with respect to the workpiece. In the machining program 76, for example, a command for the machine tool 1 is described by a command code such as a G code or an M code. Note that a machining program newly created by an operator in an information control part 20 of the control apparatus 70 may be inputted to the input part 71.

The reading-interpretation part 72 reads the machining program 76 from the input part 71. The reading-interpretation part 72 transmits a movement command to the arithmetic interpolation part 73. The arithmetic interpolation part 73 calculates a position command value for each interpolation period. For example, the arithmetic interpolation part 73 calculates a movement amount set for each time interval based on the movement command. The arithmetic interpolation part 73 transmits the position command value to the servo motor control part 74. The servo motor control part 74 calculates a movement amount in each feed axis such as the X axis, the Y axis or the Z axis based on the position command value and drives an each-axis servo motor 75.

The control apparatus 70 according to the present embodiment includes the information control part 20 that controls machining information related to machining of the workpiece, an operation part 30 to which the operator inputs the machining information or the like, and a display part 28 that displays the machining information. As for the machining information, information on a program, information on a tool, information on coordinates, and information on inspection can be exemplified. The information control part 20 obtains the machining program 76 for performing current machining from the input part 71. The information control part 20 includes an arithmetic processing part 25 that newly creates or edits a program, or obtains the machining information so as to perform an operation of the machining information. For example, the arithmetic processing part 25 can edit the machining program 76 inputted from the input part 71, create a machining program for the current machining, and transmit the machining program to the input part 71. Further, the arithmetic processing part 25 can perform predetermined determination or predetermined calculation based on the inputted machining information.

The operation part 30 includes a manual input part 29 that has a keyboard or the like and inputs the machining information by an operator's manual operation. The operation part 30 according to the present embodiment includes the display part 28. In the present embodiment, for the display part 28, a touch panel type that enables selection of a desired part by touching a screen is employed. The operator can input the machining information by operating the screen of the display part 28. The operation part 30 is not limited to this form, but an optional apparatus that enables the operator to input the machining information can be employed.

The control apparatus 70 includes a storage part 26 that stores the machining information. The storage part 26 may be a storage apparatus such as a memory card or a hard disk interconnected via a communication interface, in addition to the abovementioned ROM or RAM.

The information control part 20 includes a display control part 22 that controls an image displayed on the display part 28. The display control part 22 obtains information from the arithmetic processing part 25, or provides information to the arithmetic processing part 25. In addition, the display control part 22 has a function of creating an image based on the machining information, and displaying the image on the display part 28.

The information control part 20 can obtain signals of various sensors that detect an operation state of the machine tool. As for various sensors, a sensor that detects a movement amount in each feed axis, a sensor fitted to the each-axis servo motor 75 that detects a rotational speed, and a sensor that detects a load of the main spindle, or the like are exemplified.

The tool replacement apparatus 40 is driven based on a command from the information control part 20. In addition, the tool measurement apparatus 60 is operated based on a command from the information control part 20. The information on a laser light detected by the tool measurement apparatus 60 is transmitted to the information control part 20. The arithmetic processing part 25 obtains a blocked state of the laser light 60a obtained by the tool measurement apparatus 60 and machine coordinates of each axis, and calculates the tool size based on the blocked state and the machine coordinates.

Figure 3:
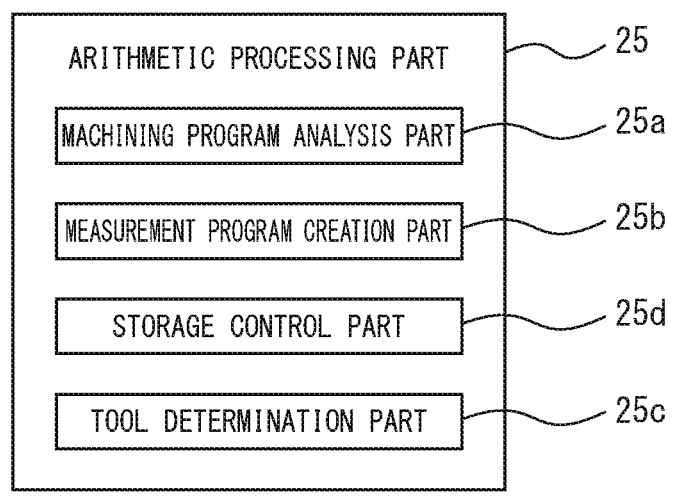
FIG. 3 is a block diagram of an arithmetic processing part of a control apparatus for the machine tool.

FIG. 3 illustrates a block diagram of the arithmetic processing part 25. The arithmetic processing part 25 includes a machining program analysis part 25a that performs analysis of the machining program 76. The arithmetic processing part 25 includes a measurement program creation part 25b that creates a measurement program which measures the tool size. The arithmetic processing part 25 includes a tool determination part 25c that performs various determinations based on the tool size measured by the tool measurement apparatus. The arithmetic processing part 25 includes a storage control part 25d that stores the machining information in the storage part 26 or reads the machining information from the storage part 26.

Figure 4:
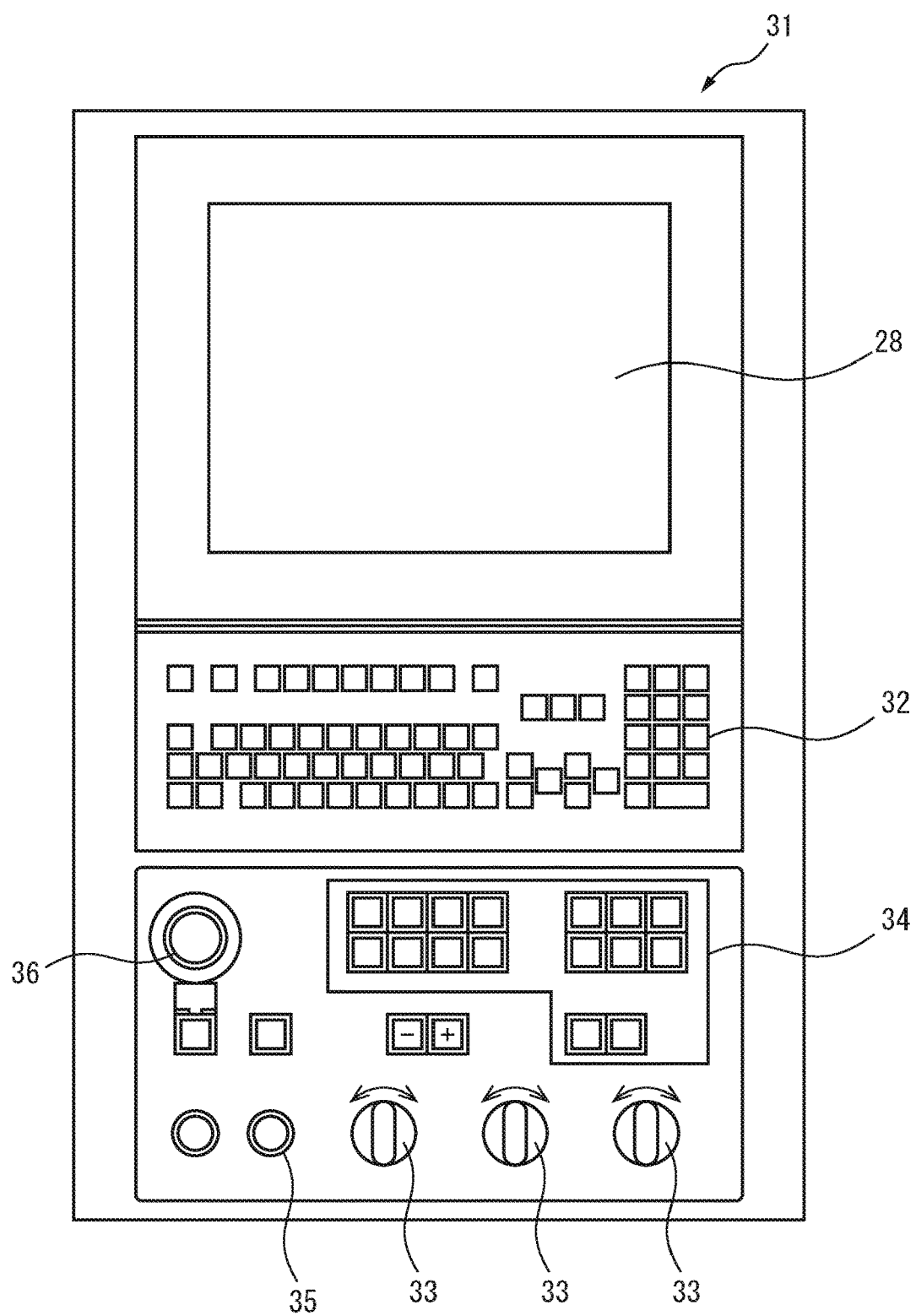
FIG. 4 is a schematic front view of an operation panel of the machine tool.

FIG. 4 illustrates a front view of an operation panel that is placed in the control apparatus of the machine tool. Referring to FIG. 1, FIG. 2, and FIG. 4, the operation panel 31 includes the operation part 30 and the display part 28 of the control apparatus 70. The operation panel 31 includes a key input part 32. In the key input part 32, a plurality of key switches is placed. By pressing the key switches of the key input part 32, predetermined numerals or characters can be inputted.

In addition, the operation panel 31 includes an operation switch part 34 that selects a predetermined operation, and an override setting parts 33 that perform setting of override values. The override setting part 33 can set, for example, an override value of the rotational speed of the main spindle or an override value of a machining feed speed. The key input part 32, the operation switch part 34, the override setting part 33 or the like functions as the manual input part 29. In addition, the operation panel 31 includes buttons such as an emergency stop button 36 that immediately stops the machine tool 1 at the time of abnormalities of the machine tool 1, and an execution button 35 for staring driving of the machine tool 1.

Figure 5:
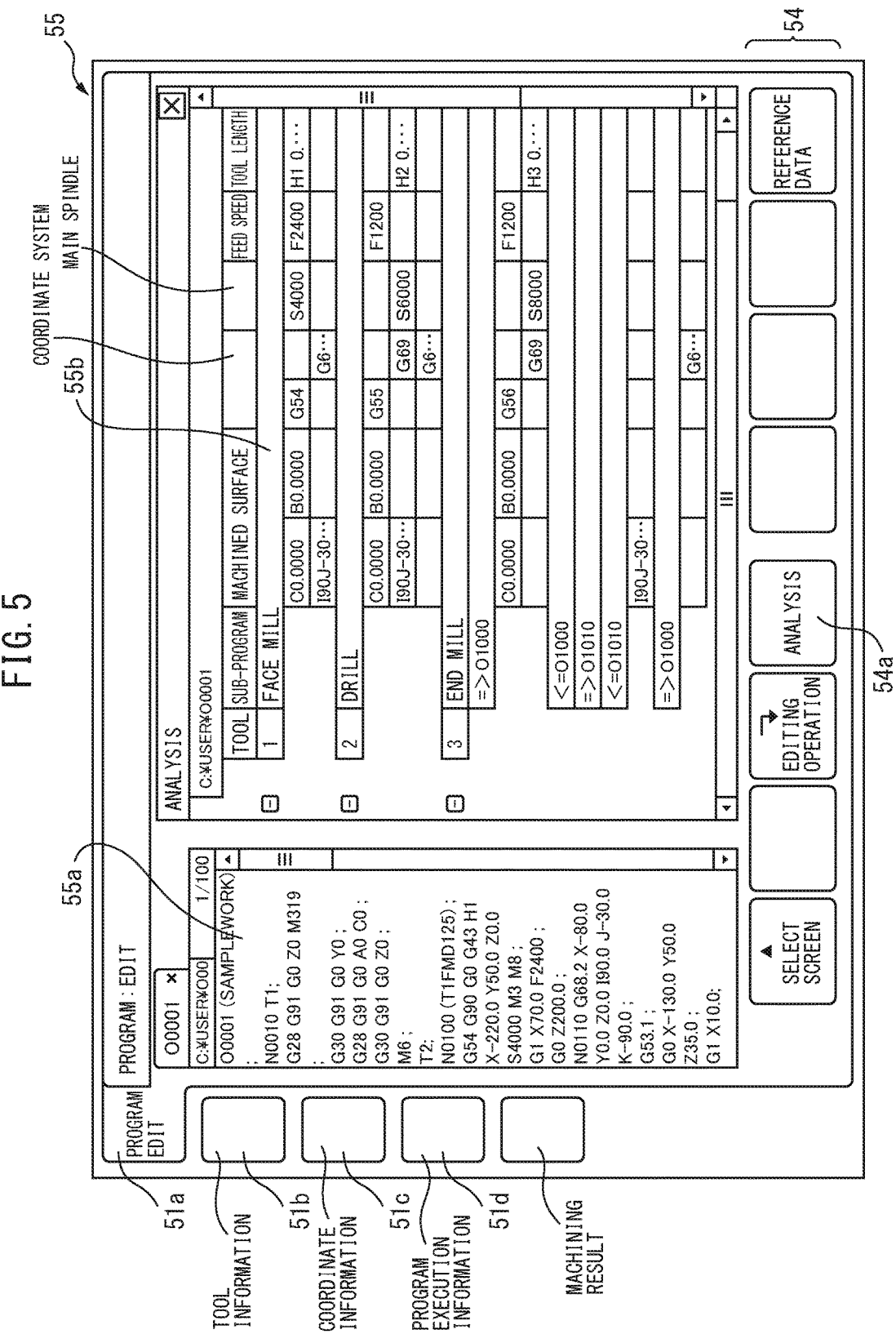
FIG. 5 is a program edit screen according to an embodiment.

FIG. 5 illustrates a program edit screen for displaying and editing the machining program. A program edit screen 55 displayed on the display part 28 is a screen for creating and displaying the machining program to perform machining of the workpiece or a test program for test running. The program creation includes a case where a new program is created and a case where a program already created is edited. On the left side of the screen, selecting parts 51a to 51d that switch a screen to be displayed are placed. In the example illustrated in FIG. 5, the program edit screen 55 is displayed by the operator who presses the selection part 51a on the program edit.

By pressing the selection parts 51a to 51d, a screen frequently used for actual machining can be displayed. For example, a tool information screen can be displayed by pressing the selection part 51b on the tool information. The tool information screen is a screen for inputting, displaying and editing the information that relates to the tool. A coordinate information screen can be displayed by pressing the selection part 51c on the coordinate information. The coordinate information screen is a screen for inputting, displaying and editing the coordinate information. An execution information screen can be displayed by pressing the selection part 51d on the program execution information. The execution information screen is a screen for displaying a state of the machine tool or a machining state during the execution of the machining program. A button area 54 is placed at a lower part of each screen. In the button area 54, a button for performing a predetermined operation is placed.

The program edit screen 55 includes a display area 55a in which a content of the machining program is displayed, and a display area 55b in which an outline of the machining program is displayed. When the operator presses a button 54a, the machining program analysis part 25a of the arithmetic processing part 25 executes analysis of the machining program. In the example illustrated in FIG. 5, a screen after the execution of the analysis of the machining program is displayed. In the display area 55b, information on a machined surface, a coordinate system or the like is displayed for each tool used such as a face mill or a drill. In addition, when a sub-program is included in a main program, information on the sub-program is displayed. The operator can check the machining program displayed in the display area 55a while checking the display area 55b. Alternatively, the operator can easily perform editing of the machining program.

Figure 6:
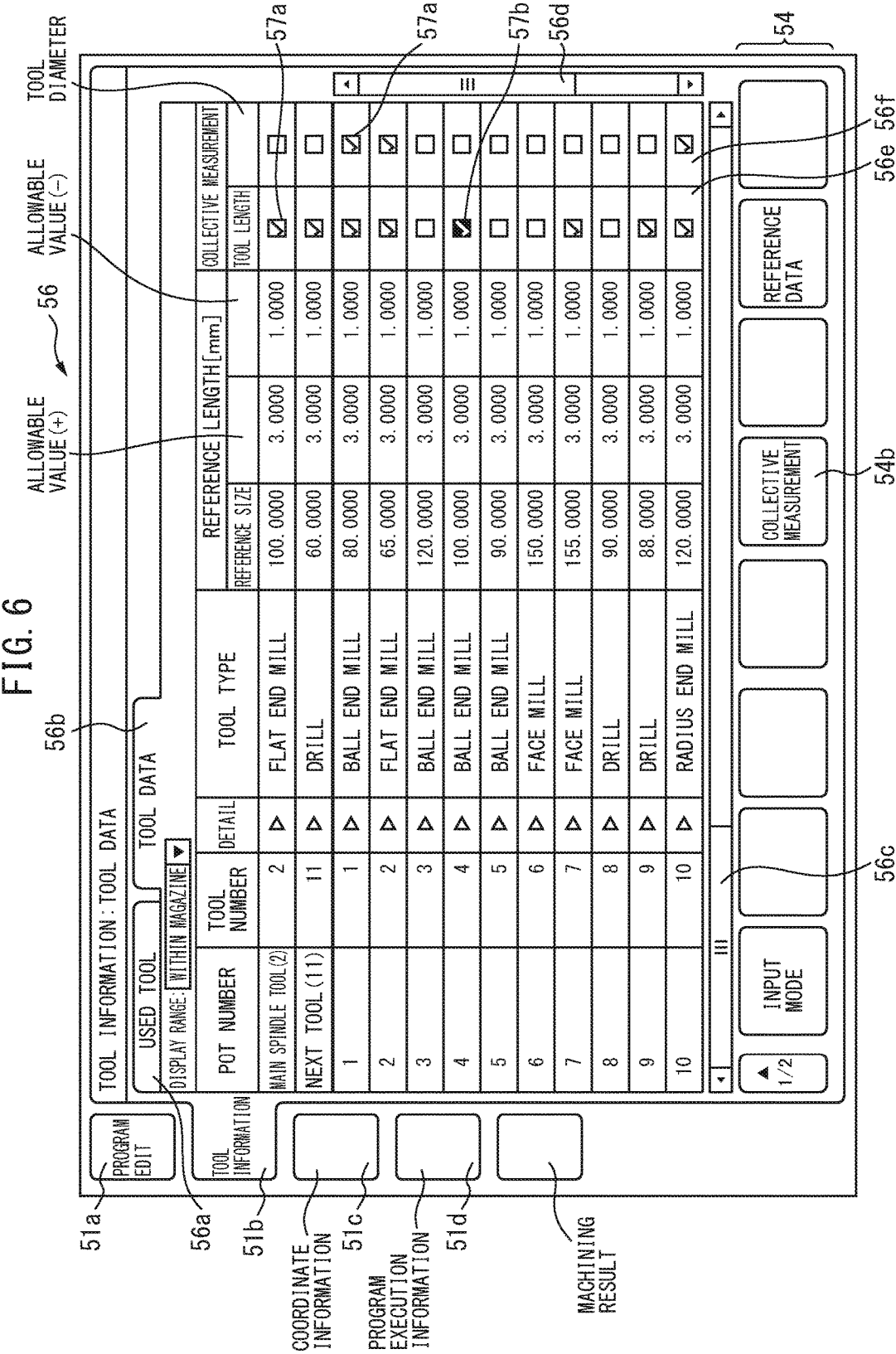
FIG. 6 is a first screen on a tool information screen according to the embodiment.

FIG. 6 illustrates the tool information screen for displaying and editing tool information. By selecting the selection part 51b on the tool information, the tool information can be displayed. On the tool information screen 56, there are a selection part 56a that selects a screen which displays the tool to be used, and a selection part 56b that selects a screen which displays and edits the tool information stored in the storage part. Here, the selection part 56b on the tool data is selected. The information of each tool is displayed in a table form. A tool number is a number for specifying each tool. In the section of pot numbers, tool pocket numbers of the tool magazine 41 are shown. Then, a main spindle tool indicates a tool fitted to the main spindle. A next tool indicates the tool that is placed at a standby positon of the tool and is scheduled to be used next.

On the tool information screen 56, a plurality of pieces of information is formed to be displayable for each tool. By moving a scroll bar 56c, various information on each tool can be displayed. In addition, by moving a scroll bar 56d, information on the tool that is not displayed on the screen can be displayed. On the tool information screen 56, all the tools stored in the tool magazine 41 are displayed. Accordingly, tools that are not described in the machining program for the current machining are also displayed. Note that, on the tool information screen 56, all the tools stored in the storage part 26 can also be displayed.

In the machine tool 1 according to the present embodiment, before the machining is performed based on the machining program, tools used in the machining program can be automatically selected. Then, the machine tool can collectively measure sizes of the tools selected by the tool measurement apparatus 60.

Referring to FIG. 3 and FIG. 5, when collectively performing measurement of the tool sizes automatically, analysis of a program is performed first on the program edit screen 55. When the button 54a on analysis in the button area 54 is pressed, the machining program analysis part 25a executes analysis of the machining program.

The machining program analysis part 25a extracts measurement related information on measurement of a tool size from the machining program. The measurement related information can include at least one of a tool number, presence of correction of a tool length, presence of correction of a tool diameter, and a rotational speed of the main spindle during the machining. In the present embodiment, the machining program analysis part 25a extracts, as measurement related information, the tool number, items of correcting tool sizes, and a rotational speed of the main spindle during the machining set for each tool. The items of correcting tool sizes according to the present embodiment are a tool length and a tool diameter.

In the present embodiment, when performing measurement of the tool sizes, it is set that measurement of a tool length be executed unless specified otherwise by the operator. In the present embodiment, when correction of a tool diameter is performed inside the machining program 76, it is set that measurement of a tool diameter also be executed. On the other hand, when correction of the tool diameter is not performed inside the machining program 76, it is set that the tool diameter not be measured. Note that, for the tool length, when correction of the tool length is not performed inside the machining program 76, it may be set that the tool length not be measured. Thus, the machining program analysis part 25a can extract the presence of correction of the tool length and the presence of correction of the tool diameter among the measurement related information by analyzing the data inside the machining program 76.

After the analysis is performed by the machining program analysis part 25a, the storage control part 25d stores, as the measurement related information, the tool number, the items of correcting the tool sizes and the rotational speed of the main spindle, which have been extracted, in the storage part 26.

Referring to FIG. 6, after the analysis of the machining program 76 is performed, the operator selects the selection part 51b so as to display the tool information screen 56. Selection sections 56e and 56f are sections that select tools in which automatic size measurement is executed. The display control part 22 displays marks 57a and 57b in the selection sections 56e and 56f based on the items of correcting the tool sizes extracted from the machining program 76. A tool displayed with the mark 57a is described in the machining program 76, and the size measurement is not performed. The mark 57b is displayed on a tool that is described in the machining program 76, in which size measurement was performed in the past, and of which the measurement result is stored in the storage part 26.

With regard to the measurement of the tool length, all the tools described in the machining program 76 are automatically selected. With regard to the measurement of the tool diameter, a tool of which correction of the tool diameter is performed in the machining program 76 is automatically selected. Note that the operator can add or delete items to be measured such as a tool length for a predetermined tool on the tool information screen 56.

Thus, the machining program analysis part 25a extracts the tool described in the machining program. The display control part 22 displays an image where measurement of the tool length is selected for the tool described in the machining program. On the other hand, the machining program analysis part 25a determines whether or not correction of the tool diameter is included in the machining program. When correction of the tool diameter is included, the display control part 22 displays an image on the display part 28 where measurement of the tool diameter is selected.

The control apparatus 70 according to the present embodiment can automatically select the tools used in the machining program and the correction items, thereby preventing the operator from forgetting to select or selecting tools of which measurement is unnecessary. In addition, the tools and the correction items described in the machining program 76 can be easily selected within a short time.

Next, the operator presses a button 54b for a collective measurement in the button area 54. A notification for executing collective measurement of tools is displayed on the display part 28. In this state, referring to FIG. 4, collective measurement of the tool sizes is started by pressing the execution button 35 of the operation panel 31. The machine tool 1 successively performs size measurement of a plurality of selected tools.

Referring to FIG. 2 and FIG. 3, the arithmetic processing part 25 automatically creates a measurement program for performing measurement of the tool sizes first. The measurement program creation part 25b creates the measurement program based on the measurement related information extracted from the machining program 76 and the basic information on the tool.

Referring to FIG. 6, information related to the tool includes the basic information on the tool that is inputted in advance by the operator to the control apparatus 70 and is stored in the storage part 26. As for the basic information on the tool, a tool name and a tool type can be exemplified. In addition, as for the basic information on the tool are the number of blades, a reference length that is a reference tool length, and a reference diameter that is a reference tool diameter can be exemplified. The reference length includes an allowable value that determines whether or not the tool is usable in addition to a basic size. In the present embodiment, an allowable value on the positive side and an allowable value on the negative side are individually set. The reference diameter can be displayed by moving the scroll bar 56c. As for the reference diameter, as is the case with the reference length, a basic size, an allowable value on the positive side and an allowable value on the negative side are set in advance.

Further, a ball end mill has a tip part in a curved shape. A radius end mill has a corner part of a tip part in a curved shape. In a tool with such curved parts, a curvature radius at an end part is included as a reference in the basic information on the tool. Also for the curvature radius, a basic size is set in advance. The basic information on the tool such as the basic sizes and the allowable values can be inputted or changed by the operator who operates the operation part 30.

The measurement program creation part 25b according to the present invention creates a measurement program for each tool. In the storage part 26, rules for creating measurement programs are stored in advance. The measurement program creation part 25b selects one rule for measuring the tool size based on the basic information on the tool and the measurement related information. A measurement program is created according to the selected rule. For example, it is necessary to set an argument of a command code for measuring a tool length or a tool diameter. The measurement program creation part 25b sets the argument of the command code based on the basic information on the tool and the measurement related information.

As for the argument of the command code, the rotational speed of the main spindle included in the measurement related information can be exemplified. In addition, as for the argument of the command code, an axial shift amount of the tool that is used when measuring the tool diameter can be exemplified. In addition, a radial shift amount of the tool that is used when measuring the tool length can be exemplified. Next, shift amounts with respect to measurement positions will be described.

Figure 7:
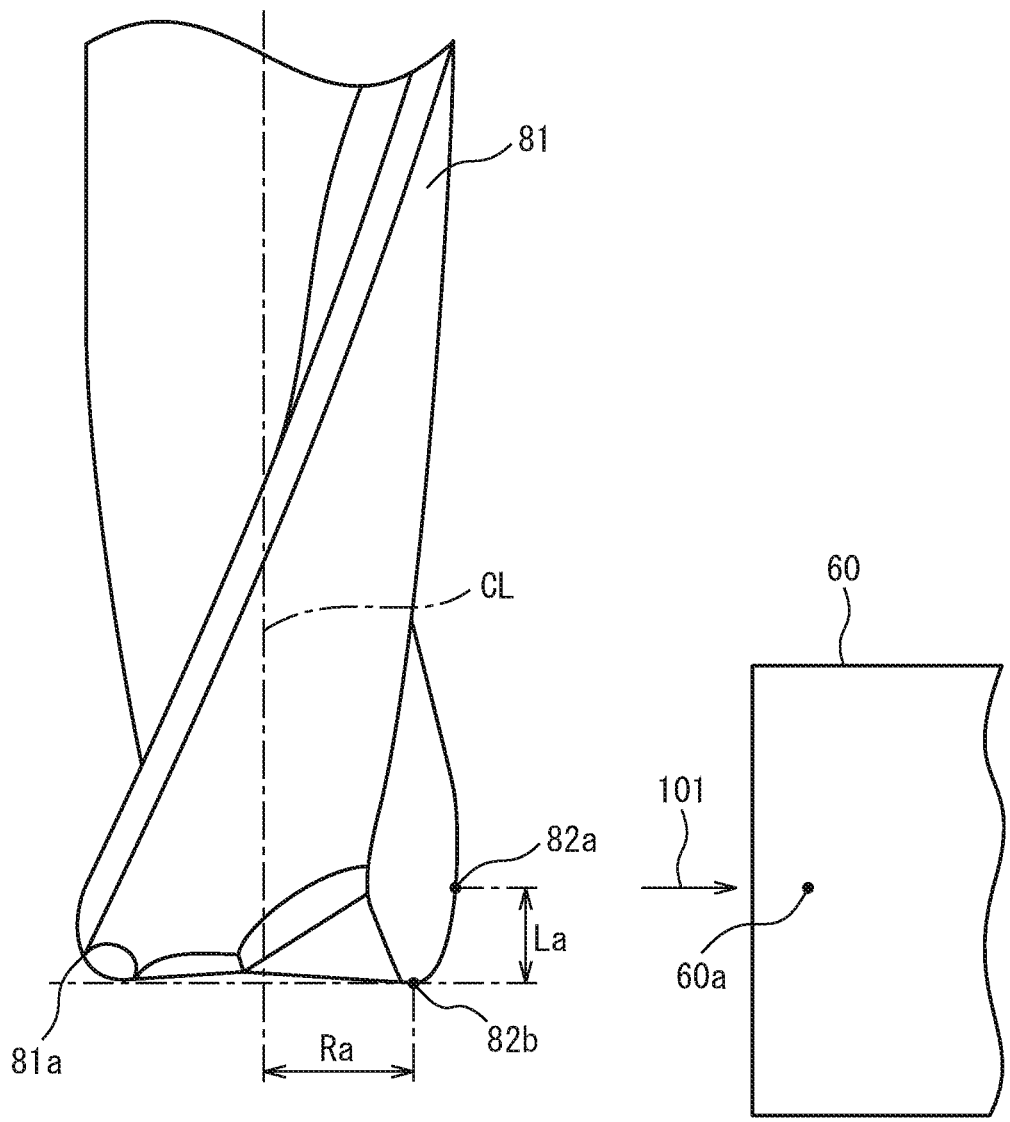
FIG. 7 is a front view of a tip part of a radius end mill.

FIG. 7 illustrates an expanded front view of a tip of the radius end mill. Herein, a radius end mill 81 will be exemplified for description of a tool. In the measurement of the tool size according to the present embodiment, the tool sizes are measured by causing a part of the tool to come into contact with the laser light while rotating the tool. The radius end mill 81 has a corner part 81a of the tip part that is formed in a curved shape. In other words, unlike a flat end mill, a sectional shape of the corner part 81a is curved. Accordingly, it is preferable to measure a position on an outermost side that comes into contact with the workpiece is measured while avoiding the part of the curved shape in the size measurement.

For example, when performing measurement of the tool diameter, it is preferable to move the tool so that a measuring point 82a avoiding the part of the curved shape may come into contact with the laser light. The measurement is preferably performed at the measuring point 82a separated by a shift amount La from the tip of the radius end mill 81 in an axial direction. As indicated by an arrow 101, accurate measurement can be performed by causing the measuring point 82a to come into contact with the laser light 60a of the tool measurement apparatus 60. Similarly, when performing measurement of the tool length, it is preferable to move the tool so that a measuring point 82b avoiding the part of the curved shape may come into contact with the laser light 60a. The measurement is preferably performed at the measuring point 82b separated by a shift amount Ra from a center axis CL of the radius end mill 81 in a radial direction.

The shift amounts La and Ra are defined depending on the tool type or the tool size. The curvature radius of the corner part 81a of each tool is included in the basic information on the tool. The measurement program creation part 25b according to the present embodiment automatically calculates the shift amounts La and Ra based on the basic information on the tool. The measurement program creation part 25b sets the shift amounts La and Ra as arguments of the command codes for performing measurement of the tool sizes. By driving the each-axis servo motor 75 based on the command codes, the control apparatus 70 can cause the measuring points 82a and 82b to come into contact with the laser light 60a.

Shift amounts at such measuring points vary depending on the tool. For example, when the tool is a flat end mill, a radial shift amount Ra can set a value obtained by subtracting a predetermined value from a reference diameter. An axial shift amount La can be set to 0 mm. In addition, when the tool is a ball end mill, a radial shift amount Ra can be set to 0 mm. An axial shift amount La can be set equal to a curvature radius of a tip part.

The measurement program creation part 25b according to the present embodiment is formed to be able to calculate a shift amount necessary for each tool. The measurement program creation part 25b calculates a measurement positon of each tool based on the basic information on the tool. At the calculated measurement position, the measurement of the tool size is performed. Accordingly, accurate measurement of the tool size can be performed. In addition, erroneous setting of a shift amount or the like by the operator can be prevented.

The control apparatus according to the present embodiment automatically creates a measurement program for each tool. Accordingly, the operator can easily execute measurement of the tool sizes without creating measurement programs corresponding to the respective tools.

A warming-up operation of the machine tool 1 is executed before the tool sizes are measured. In the machine tool 1, when the operation continues, a temperature of the main spindle 4 rises due to heat generation at a bearing or the like. When the temperature of the main spindle 4 rises, the main spindle expands by heat and a positon of a tool center changes. For example, a position of a tip of the flat end mill moves along with the rise in the temperature of the main spindle.

Figure 8:
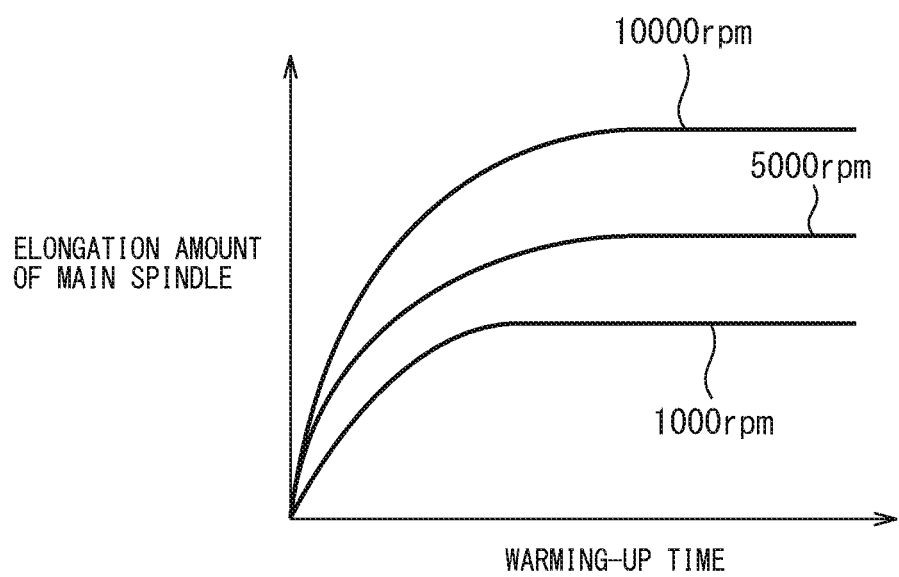
FIG. 8 is a graph of an elongation amount of a main spindle with respect to a warming-up time.

FIG. 8 is a graph illustrating a relationship between warming-up time of the machine tool and an elongation amount of the main spindle in the axial direction. The elongation amount of the main spindle corresponds to a movement amount of the position of the tip of the tool. In this graph, elongation amounts of three types of rotational speeds of the main spindle 4 are described. It can be understood that as the rotational speed of the main spindle 4 gets higher, a highest temperature of the main spindle becomes higher and the elongation amount of the main spindle increases. It is understood, however, that the elongation amount of the main spindle becomes substantially constant at any rotational speed after the lapse of a predetermined time. Thus, the elongation amount of the main spindle becomes constant by continuing the warming-up operation for a predetermined time or more. When the machine tool 1 is determined, a maximum elongation amount of the main spindle depends not on the tool type or the tool size but on the rotational speed of the main spindle 4.

The arithmetic processing part 25 of the control apparatus 70 extracts a rotational speed of the tool from the machining program 76. The rotational speed of the tool corresponds to the rotational speed of the main spindle. During the warming-up operation, driving is performed at a rotational speed when actually performing machining. Accordingly, the elongation amount of the main spindle can be set equal to that during the actual machining, and the tool sizes can be accurately measured. In the storage part 26, the time of warming-up operation corresponding to the rotational speed of the main spindle is stored in advance. Then, the control apparatus 70 of the machine tool sets time of a warming-up operation corresponding to the rotational speed of the main spindle.

The control apparatus 70 executes the warming-up operation at the set time before the tool sizes are measured. Next, the tool sizes are measured based on the measurement program. Note that a command of the warming-up operation may be included in the measurement program. Thus, the size measurement of one tool can be executed. The storage control part 25d causes the measured tool sizes to be stored in the storage part 26.

The control apparatus 70 drives the tool replacement apparatus 40 so as to replace the tool after the measurement of one tool is finished. The tool replacement apparatus 40 returns the tool fitted to the main spindle 4 to the tool magazine 41. Then, the tool replacement apparatus 40 fits a tool to be measured next to the main spindle 4. Subsequently, a warming-up operation and size measurement of the next tool are automatically executed. The control apparatus 70 repeats this control until measurement of all the tools on which the marks 57a and 57b are displayed is finished.

Note that, in the present embodiment, the warming-up operation is executed for a time length corresponding to the rotational speed of the tool for each one tool. The embodiment is not limited to this, and the warming-up operation may be shortened in time or even omitted based on the rotational speed of the main spindle during measurement of a previous tool and a next tool.

Figure 9:
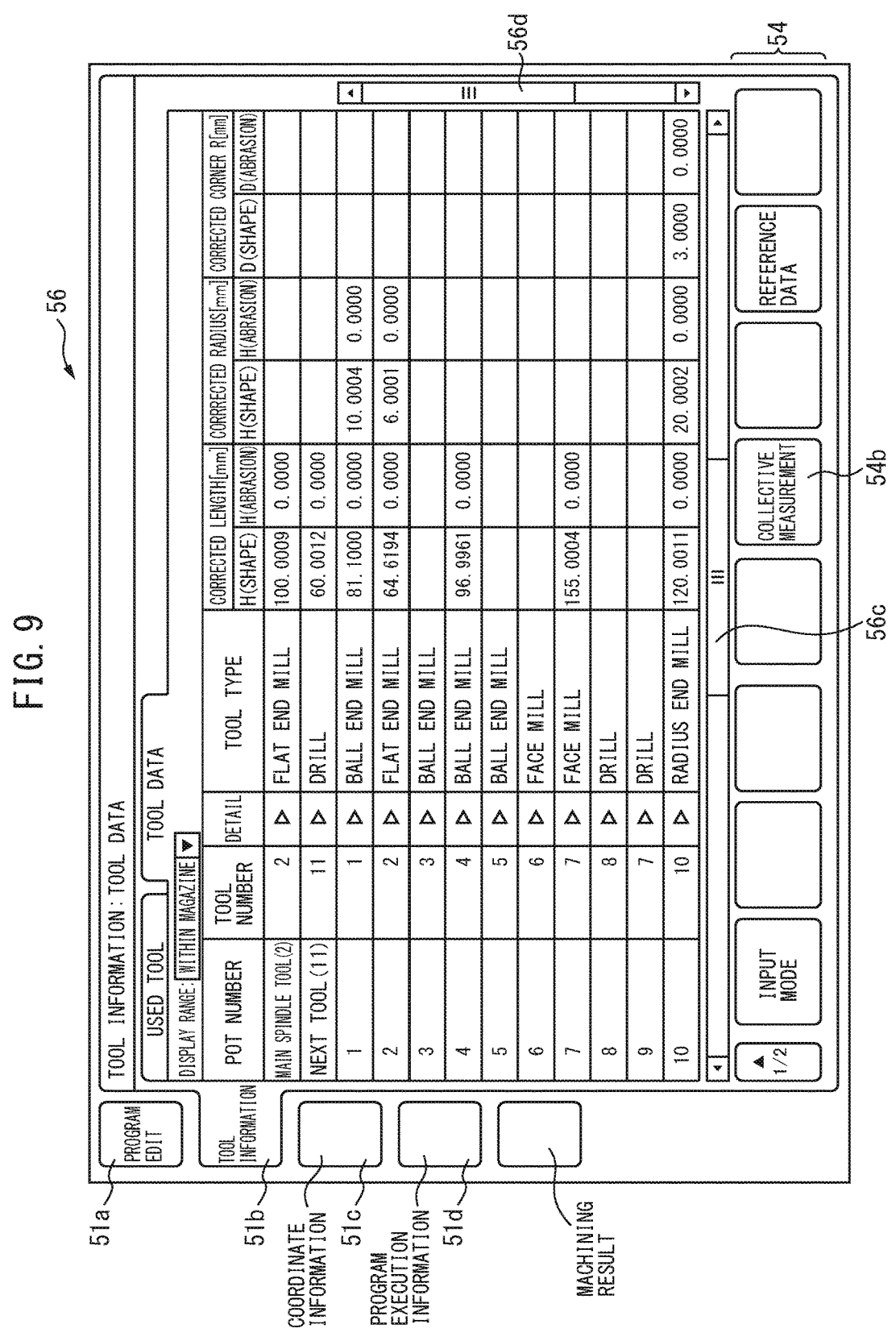

FIG. 9 illustrates the tool information screen after the measurement of the tool size is executed. On the tool information screen 56 illustrated in FIG. 9, a corrected length and a corrected radius are displayed as measurement results obtained by moving the scroll bar 56c. The corrected length indicates a measurement result of a tool length. The corrected radius indicates a measurement result of a tool diameter. In the actual machining, the machine tool 1 is driven based on the corrected length and the corrected radius. For example, the information control part 20 edits the machining program so as to correct a tool path based on the corrected length and the corrected radius.

The display control part 22 obtains a measurement result from the storage part 26 and displays the measurement result on the tool information screen 56. For a tool of which measurement is performed, measured values are displayed in the sections of the corrected length and the corrected radius. The operator can check the measured values. Note that a corrected corner R indicates a curvature radius of the corner part of the radius end mill. In the present embodiment, when the curvature radius is corrected, the operator inputs a corrected value of the curvature radius by the operation part 30.

In the example illustrated in FIG. 9, the sections of items such as a tool of which size measurement is not performed and a corrected radius are blank. The embodiment is not limited to this, and for example, a reference length, a reference diameter, and a reference curvature radius may be displayed.

The control apparatus according to the present embodiment can perform measurement of the tool sizes while automatically changing measurement conditions for every tool. Size measurement can be performed automatically by a measurement method which corresponds to the tool. In addition, size measurement of a plurality of tools can be continuously and automatically performed. Accordingly, erroneous operations of the operator can be suppressed. Further, measurement of the tool sizes can be performed within a short time. In addition, the measurement positions of the tools, of which size measurement is performed, are automatically calculated, and the size measurement is performed at the measurement positions. Accordingly, the size measurement of the tools can be accurately performed within a short time.

Further, in the measurement of the tool sizes according to present embodiment, the tool sizes are measured while rotating the main spindle at the rotational speed extracted from the measurement related information. Since the rotation is performed at the speed equal to the rotational speed in the actual machining, the tool sizes can be accurately measured. As a result, machining accuracy is improved.

In the basic information on the tool according to the present embodiment, a tool inhibited from rotation, a tool inhibited from use, and a tool inhibited from size measurement are set in advance. As a tool inhibited from rotation, for example, a probe for measuring a workpiece or a spring-necked turning tool are exemplified. As a tool inhibited from use, for example, a tool having a size exceeding an allowable range, a tool that has reached its life, a broken tool, or the like is exemplified. As a tool inhibited from size measurement, for example, a tool that cannot be measured by the tool measurement apparatus due to its large tip part is exemplified. An example such as a face mill or the like is exemplified.

Such inhibited items of tools can be displayed by moving the scroll bar 56c. In addition, referring to FIG. 2 and FIG. 6, even when tools listed as such inhibited items are selected so as to perform the size measurement in the selection sections 56e and 56f, the arithmetic processing part 25 performs control not to perform size measurement. By this control, performing unnecessary size measurement can be prevented.

In addition, the arithmetic processing part 25 according to the present embodiment sets approximate tool lengths based on the basic size and the allowable values of the reference length. The first approximate tool length is a length obtained by adding the allowable value on the positive side to the basic size. The first approximate tool length becomes a long approximate tool length. The second approximate tool length is a length obtained by subtracting the allowable value on the negative side from the basic size. The second approximate tool length becomes a short approximate tool length. Then, the measurement program creation part 25b of the control apparatus 70 can set the first approximate tool length to be the argument of the command code for tool measurement. Based on the first approximate tool length, the machine tool 1 can move the main spindle 4 and the table 14 relatively to each other at a high speed to a position where the tool is slightly separated from the laser light 60a. For example, the relative movement can be made at the high speed to a position where the tool is separated from the laser light 60a by a length including a predetermined marginal length to the first approximate tool length. By this control, the movement time of the table 14 and the main spindle 4 can be shortened, and the measuring time of the tool can be shortened.

Further, the control apparatus 70 according to the present embodiment can determine whether or not the measured tool is a tool used in the machining program based on the measurement results of the tool sizes. Referring to FIG. 6, the basic sizes and the allowable values are set in advance for the reference length and the reference diameter. In other words, allowable ranges are set for the tool length and the tool diameter.

Referring to FIG. 3, the tool determination part 25c determines whether or not the measurement results of the tool are within the allowable ranges of the tool sizes. When the tool sizes deviate from the allowable ranges, the tool determination part 25c determines that the measured tool, in other words, the tool placed in the tool magazine 41, is not a desired tool but a different tool. In this case, the display control part 22 displays an image where a wrong tool is placed in the tool magazine 41 on the tool information screen 56. For example, referring to FIG. 9, there is a section that displays a warning when the scroll bar 56c is moved, and a warning sentence indicating an error content is displayed in this section.

According to another control for determining whether or not the tool to be used is a desired tool, the determination can be made based on the first approximate tool length or the second approximate tool length. The tool determination part 25c can determine that the currently measured tool is different when a signal is detected before a position based on the first approximate tool length reaches during a period when the tool is caused to approach the tool measurement apparatus 60. In the machine tool 1 according to the present embodiment, it is determined that the tool is different in the case that a position at which the tool blocks the laser light 60a is separated from a relative position based on the first approximate tool length. The measurement of the tool size is interrupted, and the display control part 22 can display a message indicating that the tool is different on the tool information screen 56.

Alternatively, the tool determination part 25c can determine that the tool is different when a signal is not detected even after a position based on the second approximate tool length has reached during the period when the tool is caused to approach the tool measurement apparatus 60. In the machine tool 1 according to the present embodiment, even when a distance between the tip part of the tool and the laser light 60a becomes equal to the second approximate tool length, it can be determined that the currently measured tool is different when the tip part of the tool does not block the laser light. The measurement of the tool size is interrupted, and a message indicating that the tool is different is displayed on the tool information screen.

In addition, with respect to the tool diameter, as is the case with the determination based on the tool length, a first approximate tool diameter and a second approximate tool diameter are set, and it is determined whether or not the tool to be used is a desired tool based on the first approximate tool diameter and the second approximate tool diameter.

Thus, the control apparatus 70 according to the present embodiment can automatically detect that the different tool is placed in the tool magazine 41. In particular, even in the case of a tool having a similar outer shape, it can be easily detected that the tool is not a desired tool.

The abovementioned embodiments can be appropriately combined. In each of the abovementioned drawings, similar and equivalent portions are assigned similar reference signs. Note that the abovementioned embodiments are exemplary and are not to limit the invention. In addition, in the embodiments, changes of the embodiments described within the appended claims are included.

REFERENCE SINGS LIST

1 machine tool
5 tool
20 information control part
22 display control part
25 arithmetic processing part
25a machining program analysis part
25b measurement program creation part
25c tool determination part
26 storage part
28 display part
30 operation part
40 tool replacement apparatus
41 tool magazine
55 program edit screen 56 tool information screen
56e, 56f selection section
60 tool measurement apparatus
70 control apparatus
76 machining program
81 radius end mill
82a, 82b measuring point

The invention claimed is:

1. A control apparatus for a machine tool that replaces a tool and machines a workpiece based on a machining program, comprising:
   a CPU;
   a non-transitory storage medium having data stored therein representing software executable by the CPU, the software, when executed by the CPU, performs the steps of,
      analyzing the machining program and extracting measurement related information on size measurement of the tool from the machining program,
      storing the measurement related information and rules for creating measurement programs; and
      selecting one rule corresponding to the measurement related information and basic information on the tool and creating a measurement program for measuring a size of the tool based on the measurement related information the basic information of the tool inputted in advance and the selected rule.

2. The control apparatus for the machine tool according to claim 1, wherein the measurement related information includes at least one of a tool number, presence of correction of a tool length, presence of correction of a tool diameter, and a rotational speed of a main spindle during machining.

3. The control apparatus for the machine tool according to claim 1, wherein the basic information of the tool includes at least one of a tool type, a reference tool length, a reference tool diameter, the number of blades, and a curvature radius of an end part of the tool.

4. The control apparatus for the machine tool according to claim 1, wherein the steps further comprise calculating a measurement position in the tool based on the basic information on the tool, and creating the measurement program based on the measurement position.

5. The control apparatus for the machine tool according to claim 1, further comprising:
   a display that displays information on machining,
   wherein the steps further comprise controlling display of the display, determining whether or not correction of a tool diameter is included in the machining program, and displaying an image where measurement of the tool diameter is selected on the display when the correction of the tool diameter is included.

6. The control apparatus for the machine tool according to claim 1, wherein the steps further comprise determining whether or not the size-measured tool is a predetermined tool, by determining that the measured tool is different from the predetermined tool when the measured size of the tool exceeds a predetermined allowable range.

7. A machine tool comprising:
   the control apparatus for the machine tool according to claim 1; and
   a tool measurement apparatus that measures a size of a tool.

* * * * *